United States Patent
Schulte

(10) Patent No.: US 9,369,057 B1
(45) Date of Patent: Jun. 14, 2016

(54) APPARATUS HAVING A VACUUM CHAMBER CONFIGURED TO CONVERT ELECTROMAGNETIC WAVES TO ELECTRICITY

(71) Applicant: David J. Schulte, Harbor Springs, MI (US)

(72) Inventor: David J. Schulte, Harbor Springs, MI (US)

( * ) Notice: Subject to any disclaimer, the term of this patent is extended or adjusted under 35 U.S.C. 154(b) by 144 days.

(21) Appl. No.: 14/229,199

(22) Filed: Mar. 28, 2014

(51) Int. Cl.
| | |
|---|---|
| *H02M 7/02* | (2006.01) |
| *H02M 7/04* | (2006.01) |
| *H01P 5/00* | (2006.01) |
| *H02M 7/00* | (2006.01) |
| *H02K 53/00* | (2006.01) |

(52) U.S. Cl.
CPC .............. *H02M 7/046* (2013.01); *H01P 5/00* (2013.01); *H02M 7/006* (2013.01); *H02K 53/00* (2013.01); *Y10S 74/09* (2013.01)

(58) Field of Classification Search
CPC ......... H02M 11/00; H02M 1/00; H02M 7/00; H02M 7/006; H02M 7/046; H02M 7/06
USPC ................ 363/8, 11, 178; 361/233; 307/151; 313/104; 333/99 MP
See application file for complete search history.

(56) References Cited

U.S. PATENT DOCUMENTS

| | | | | |
|---|---|---|---|---|
| 3,457,490 A | * | 7/1969 | Keenan ................ | H01J 25/76 307/151 |
| 3,521,146 A | * | 7/1970 | Forrer ................ | H01J 19/80 307/151 |
| 3,543,135 A | * | 11/1970 | O'Brien et al. ........ | H01J 25/76 307/151 |
| 3,886,399 A | * | 5/1975 | Symons .............. | G21K 1/08 307/151 |
| 7,379,286 B2 | | 5/2008 | Haisch et al. | |

* cited by examiner

*Primary Examiner* — Benny Lee
(74) *Attorney, Agent, or Firm* — The Weintraub Group, P.L.C.

(57) ABSTRACT

An electricity generator comprises a core having an interior chamber having a top portion and a bottom portion. The core is held at a vacuum. A frequency generator is provided for introducing and inputting electromagnetic waves into the interior chamber. A point source waveguide tube is provided to connect the frequency generator and the core, and the point source waveguide tube allows the passage of electromagnetic waves from the frequency generator into the interior chamber of the core. In addition, a plurality of electrodes is provided which extend into the interior chamber and conduct the flow of electricity away from a lining on the interior chamber.

21 Claims, 2 Drawing Sheets

APPARATUS HAVING A VACUUM CHAMBER CONFIGURED TO CONVERT ELECTROMAGNETIC WAVES TO ELECTRICITY

BACKGROUND OF THE INVENTION

1. Field of the Invention

The present invention pertains to an electricity generator. More particularly, the present invention pertains to an electricity generator for generating electricity by introducing electromagnetic waves into a vacuum.

2. Description of the Prior Art

Various types of electrical generators exist in the prior art which have been used for many years. For example, fossil fuel power plants which burn fossil fuels to generate electricity have been in common use for many years. Examples of such power plants burn fuels, such as methane, coal, or petroleum, to convert combustion products (e.g., heat) into mechanical motion, which is then converted to electricity. However, some of these fuels are obtained by purchase from foreign countries, and national security concerns exist as to the power which this gives to individuals of concern. Also, concerns exist among the public as to the by-products which result from burning these fuels, and there are concerns as to the world's finite supplies of some of these fuels.

In addition, nuclear power has also been used to generate electricity for over fifty years. While the development of nuclear power technology has advanced significantly since catastrophes such as Three Mile Island, such accidents have tainted the public's perception of generating electricity by nuclear power. As a result of the political hurdles that proponents of nuclear energy now face, the world's production of electricity by nuclear power has leveled off since the Chernobyl accident in 1986. In fact, the trend is now to decrease the use of nuclear power on a worldwide scale.

Therefore, there remains a need for a new reliable and safe electrical generator for powering today's infrastructure.

The present invention, as is detailed herein below, seeks to provide a new device for generating electricity.

SUMMARY OF THE INVENTION

According to an embodiment hereof, the present invention provides an apparatus comprising:

(a) a core having an interior chamber, the interior chamber having a lining, and the interior chamber being held at a vacuum;

(b) a waveguide having a first end and a second end, the first end being connected to the core and extending to the interior chamber, the waveguide comprising a hollow elongated tube;

(c) a frequency generator for generating electromagnetic waves, the frequency generator being connected to the second end of the waveguide, whereby the electromagnetic waves are generated by the frequency generator, pass through the hollow tube of the waveguide, and enter the interior chamber of the core;

(d) a plurality of electrodes extending into the interior chamber, the electrodes being electrically connected to an output; and (e) at least one diode that is electrically connected between the electrode and the output for regulating the direction of the flow of electricity.

Preferably, the frequency generator is a magnetron.

Optionally, the core includes a valve stem, and the there is also provided a vacuum pump that is connected to the valve stem for creating the vacuum inside the interior chamber.

Preferably the electrodes are ribbon-like in shape, such that the width of the electrodes is substantially wider than the thickness of the electrodes. Optionally, the electrodes comprise a metallic material. The electrodes can also optionally include tungsten.

Optionally, there is also provided a plurality of hollow resonator tubes. The resonator tubes have an end that extends into the interior chamber, and each resonator tube surrounds a respective electrode. The resonator tubes are preferably formed from glass.

Optionally the waveguide comprises a metallic material. More preferably, the waveguide is formed from brass or copper.

Optionally, the lining along the interior chamber of the core comprises silicone.

For a more complete understanding of the present invention, reference is made to the following detailed description and accompanying drawings. In the drawings, like reference characters refer to like parts throughout the views in which:

DETAILED DESCRIPTION OF THE INVENTION

Figure 1:
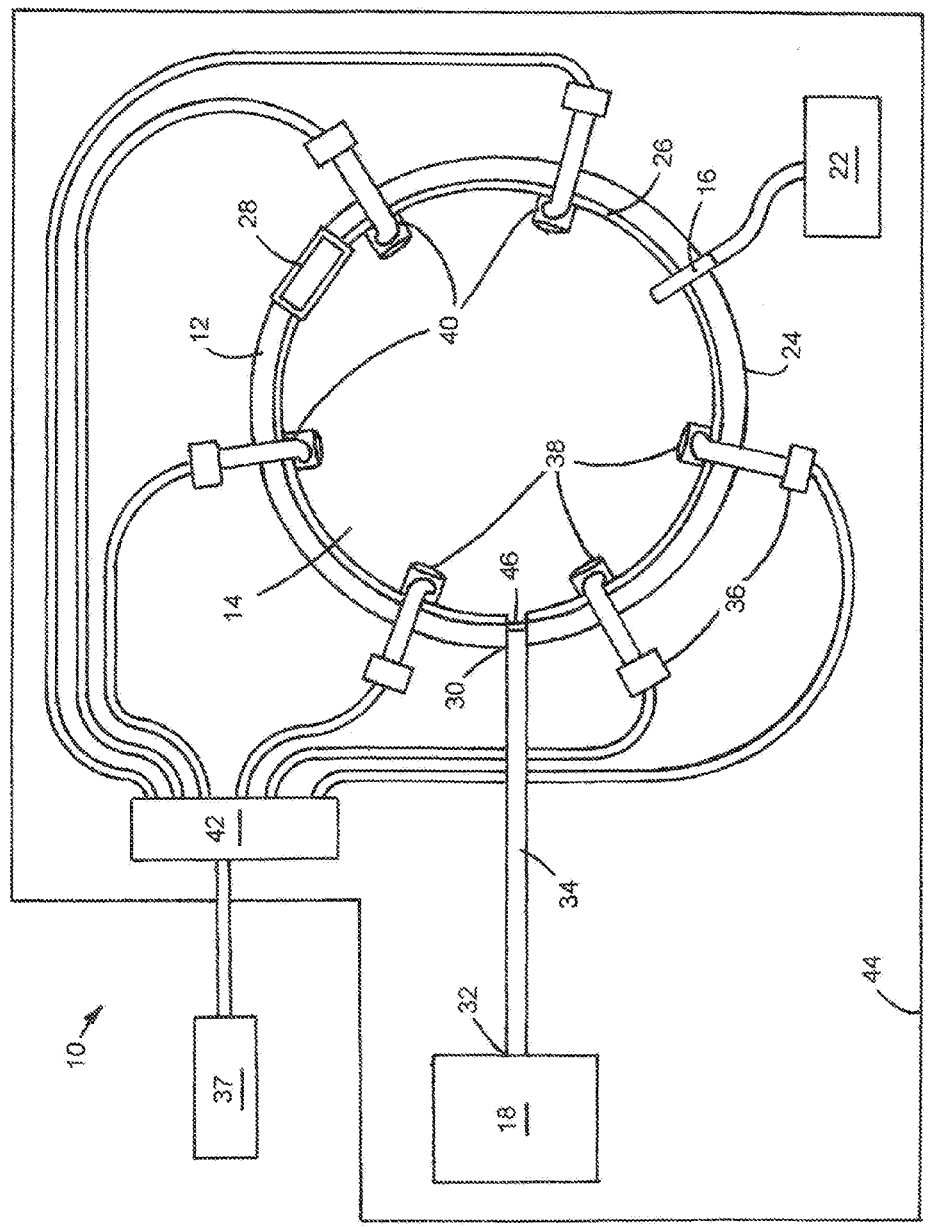
FIG. 1 is a cross-sectional view of a first embodiment of the present invention hereof.
Figure 2:
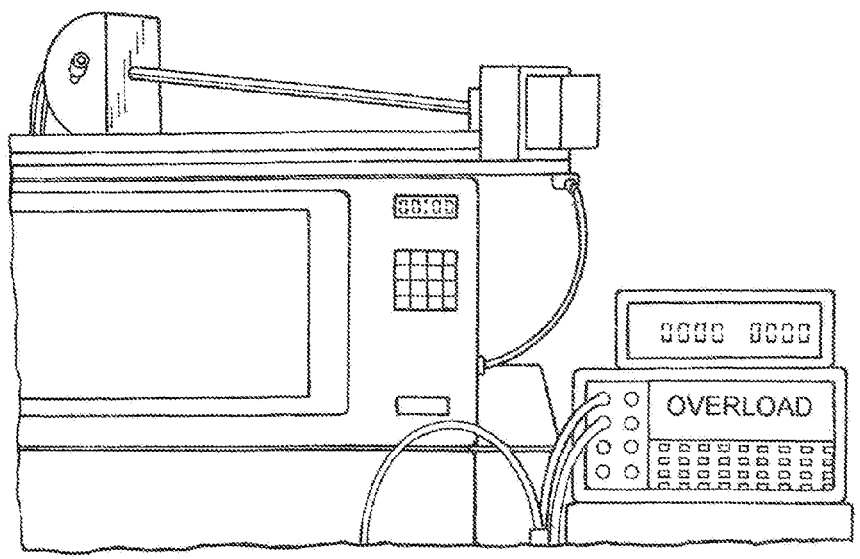
FIG. 2 is an environmental view of the invention in operation, this view includes digital meters that show the wattage into the electricity generator and an overload reading on the output, in which the metered output can measure up to 10,000 Watts.

In accordance with a first embodiment of the present invention and as shown generally in FIGS. 1 and 2, there is provided an electricity generator 10 comprising a core 12 having an interior chamber 14, a hollow waveguide tube 34 having a first end 30 that is connected to the core 12 and extending to the interior chamber 14, a frequency generator 18 for generating electromagnetic waves, a plurality of electrodes 40 extending into the interior chamber 14, the electrodes 40 being electrically connected to an output 37; and at least one diode that is electrically connected between the electrodes 40 and the output 37 for regulating the direction of the flow of electricity.

The core 12 includes the interior chamber 14 and an exterior 24. The core 12 and the interior chamber 14 can be of any shape which is suitable for use herewith, for example, spherical, oval, oblong, square, rectangular, pyramidal, etc. The exterior 24 of the core 12 can also be shaped so that the exterior 24 geometry matches that of the interior chamber 14. The core 12 comprises any suitable material. Preferably, the core 12 is comprised of a material, such as metal, glass, ceramic, a high-tensile strength plastic (e.g. high-density polyethylene, nylon, acrylonitrile butadiene styrene, polycarbonate, etc.), or the like. Even more preferably, the core 12 is a thick-walled brass chamber. Alternatively, the core 12 can comprise a thin-walled metal chamber that can be tuned to be highly excitable.

The size of the core 12 can be any dimension which is suitable for use with a particular embodiment or required performance output (as discussed further below). The size of the core 12 as used in various applications is discussed further below.

The interior chamber 14 of the core 12 is preferably spherical is shape and covered with a lining 26 to facilitate the flow of electrons to the electrodes 40. The lining 26 comprises any suitable material which can withstand high temperatures and has dielectric properties. Optionally, the lining 26 can be a capacitive conductor. That is, the lining 26 can optionally hold an electric charge, and then release that charge to a conductive material once it has reached a supersaturated state. Accordingly, the lining 26 can comprise a material such as a fluoropolymer sold under the trademark Teflon®, a polyimide film sold under the trademark Kapton®, or like materials having similar conduction and heat-resistance properties. The lining 26 can include a conductive or non-conductive material, such as silicones, graphite, graphene, paint, a thin film, or liquids or oils. Preferably, the lining 26 comprises a silicone material. The lining 26 will give up free electrons and deplete very slowly over time. The lining 26 can also be adhered to the exterior 24 of the core 12. The lining 26 can optionally have RF shielding properties to contain the RF energy inside the interior chamber 14. Furthermore, the lining 26 can alternatively a chemical reaction type lining to effectuate a chemical reaction.

As mentioned above, the interior chamber 14 is held at a vacuum. In order to accomplish the vacuum within the interior chamber 14, the core 12 optionally includes a valve stem 16. A vacuum pump 22 is provided which is connected to the valve stem 16 for creating the vacuum inside the interior chamber 14. Any suitable type of vacuum pump can be used herewith, including those that are hand-operated or those that are powered, such as a hydraulic pump. It is apparent to those having ordinary skill in the art that the type of vacuum pump that is selected will be chosen based upon the size and particular needs for the core 12. Furthermore, the vacuum pump 22 does not need to be used continuously, but only as necessary to maintain the vacuum inside the interior chamber 14.

The core 12 can optionally include a sealed entry 28 for accessing the interior chamber 14. The entry 28 can comprise a hinged locking door which is properly insulated, a removable panel, or any other suitable entry.

The power generator 10 also includes a frequency generator 18 for introducing and inserting electromagnetic waves into the interior chamber 14. The frequency generator 18 is any suitable type of frequency generator known in the art, such as a magnetron, a gyrotron, a klystron, or the like. Preferably, the frequency generator 18 is capable of outputting consistently in a narrow band of radio frequency or microwave frequency electromagnetic wavelength regions. The type of frequency generator used will be dictated, in part, by the size of the power generator 10 deployed for any particular application. Preferably the frequency generator 18 produces a frequency of at least 2.4 GHz. The frequency generator 18 is attached to the power generator 10, via the point source waveguide tube 34, as described below.

A power source (not shown) for operating the frequency generator 18 is also provided. The power source can be a DC battery, an AC outlet, or the like. In addition, the power generator 10 itself can provide the power necessary to operate the frequency generator 18, so long as an auxiliary power source (not shown), such as a battery, is provided to initially power the frequency generator 18 until the power generator 10 has produced sufficient electricity to become self-operational. The power source can be connected to the frequency generator 18 by an electrical circuit, such as a switch, to allow the power generator 10 to be turned on or off.

As shown in FIG. 1, the present invention also includes a hollow point source waveguide tube 34, or traveling wave tunnel, for directing the extracted RF energy from the frequency generator 18 to the interior chamber 14 of the power generator 10. The point source waveguide tube 34 is a hollow elongated tube which guides a wave, such as an electromagnetic wave. The waveguide tube 34 can be made of a thin-walled brass, copper, or other metallic or non-metallic materials to guide the RF energy from the frequency generator 18 into the interior chamber 14. The point source waveguide tube 34 can be formed from a material, such as cast brass, bronze, graphene, glass, polymeric materials, ceramics, or composite materials including metal. Optionally, the point source waveguide tube 34 can be plated, such as with chrome. The point source waveguide tube 34 is tuned for exact dimension based upon the frequency of the RF wavelength emitted. It is preferably circular in cross-section and made from brass.

The waveguide tube 34 can be either a thick heavy-walled cast waveguide or a thin-walled waveguide tube. Thin-walled waveguide tubes can be chosen for their resonant characteristics which may be tuned to effectuate strong standing wave resonant nodes within the waveguide walls itself. A round thin-walled waveguide is ideal. This type of waveguide will amplify the intensity and amplitude of the RF energy exiting the waveguide tube 34 via standing wave resonance phenomenon.

The waveguide tube 34 has a first end 30 and a second end 32. The first end 30 is connected to the core 12 and extends to the interior chamber 14, and the second end 32 is connected to the frequency generator 18. This arrangement allows the electromagnetic waves generated by the frequency generator 18 to pass through the hollow tube of the waveguide tube 34, and then enter the interior chamber 14 of the core 12.

A sealed RF-permeable window 46 can be secured to the core 12 at the location where the first end 30 of the waveguide tube 34 connects to the core 12. The RF-permeable window 46 can be made from glass or polymeric materials, such as those sold under the trademark Lexan®. The window 46 acts as a vacuum barrier and seals the interior chamber 14. The window 46 also allows the point source waveguide tube 34 to not be maintained at a vacuum.

The core 12, frequency generator 18, and point source waveguide tube 34 are hermetically sealed together in order to maintain the vacuum in the interior chamber 14. A plurality of gaskets is provided to ensure that the interior chamber 14 maintains a vacuum. At least one gasket from the plurality of gaskets is provided as required between each of the core 12 and the point source waveguide tube 34, as well as between the point source waveguide tube 34 and the frequency generator 18. Each of the gaskets in the plurality of gaskets is formed from any suitable type of material known in the art for providing a hermetic seal, such as an elastomer.

A plurality of electrodes 40 is also provided to attract and conduct the free electrons from the lining 26 to the output 37. The plurality of electrodes 40 are in electrical connection with the output 37. The electrodes 40 are preferably formed from a material which is conductive and resistant to high temperatures. The electrodes 40 can be formed from either metallic or non-metallic materials, and in particular, they can be formed from certain metals like tungsten. Furthermore, the plurality of electrodes 40 extends through the core 12 and into the interior chamber 14 to attract free electrons. Preferably the electrodes 40 are ribbon-like, or plate-like in shape, such that the width of the electrodes 40 is substantially wider than the thickness of the electrodes 40. It is also preferred that the electrodes 40 are slightly bent or angled (to a degree of 10° or more) to help create a spring-like resonation when the electrodes 40 are exposed to the electromagnetic waves in the interior chamber 14 of the core 12. This bending creates a spring-like loaded tension that is effectuated by bending the electrodes 40 to cause a spring-like restoring force. The electrodes 40 may be bent to a precise force using a precise microgram strain gauge that reads the spring tension. This allows the electrode 40 to touch the inside of each of a plurality of resonator tubes 38 and resonate against each tube. The plurality of resonator tubes 38 are described in greater detail below.

Each of the electrodes 40 is electrically connected to a high speed diode 36 (located between the electrode 40 and the output 37) for rectifying the electricity as it exits the chamber 14 and to prevent back feeding of electricity back into the chamber 14. Any suitable type of high speed diode can be used herewith, and it is believed that one having ordinary skill in the art can properly select a suitable diode as required by the output 37 and electrical demands. The diode 36 is preferably a high speed high frequency diode that is a high power heatsinked type through which each electrode 40 or electrode group emits its electrical energy through an attached well-insulated wire.

Optionally, there is also provided a plurality of hollow resonator tubes 38. The plurality of resonator tubes 38 have a respective end that extends into the interior chamber 14 of the core 12, and each resonator tube surrounds a respective electrode 40. The plurality of resonator tubes 38 can be formed from materials like ceramic, glass, plastics, metals or the like.

The electrodes 40 conduct electricity to an output 37, such as a DC battery, a step-up transformer, or any other suitable type of electrical receiver which is used for storing, converting, and/or transmitting electrical current.

A junction box 42 is also provided in electrical connection between the electrodes 40 and the output 37. The junction box is connected to each of the electrodes 40. Any suitable type of junction box can be used, including an oil-filled step down transformer and power line frequency-matching and monitoring electronics.

The power generator 10 can optionally be provided with means for isolating the power generator 10 from external vibration. The means for isolating can comprise a foundation such as a base or plurality of feet (not shown) which can be supported by springs, shock absorbers, shock-absorbing elastomers such as the type sold under the trademark Sorbothane®, any suitable type of viscoelastic material, or the like.

In addition, the power generator 10 can optionally be housed in a sealed shielding box 44 to contain stray radio frequency and electromagnetic energies and emissions, and to prevent the collection of electrons out of the airwaves surrounding the power generator 10. This will assure that the power generator 10 will only be pulling electrons off of the lining 26 of the chamber 14.

Optionally, a timer and pulse circuit (not shown) can be provided to control and regulate the output by turning the frequency generator 18 on and off.

It is to be appreciated by one having ordinary skill in the art that the present invention is scalable in size for various applications, as needed. For instance, the present invention can be used to provide electricity in: small-scale applications, such as laptop computers or small household appliances for which portability is desired; medium-scale applications, such as for electric cars or for household-wide electrical production; or large-scale applications, such as providing electricity to entire buildings, or as a power plant for entire cities.

Preferably, the frequency generator 18 comprises a magnetron. A magnetron is a high-powered vacuum tube that generates non-coherent microwaves. A magnetron consists of a hot filament, or cathode, which is kept at or pulsed to a high negative potential by a high-voltage, direct-current power supply. The cathode is built into the center of an evacuated, lobed, circular chamber. A magnetic field parallel to the filament is imposed by a permanent magnet. The magnetic field causes the electrons, which are attracted to the positively charged outer portion of the chamber, to spiral outward in a circular path rather than moving directly to the positive anode. Spaced around the rim of the chamber are cylindrical cavities. The cavities are open along their length and connect the common chamber space. As electrons sweep past these openings they induce a resonant, high-frequency radio field in the chamber, which in turn causes the electrons to bunch into groups.

Medium-sized applications require an output from the frequency generator 18 in the range of about 500 Watts to about 1500 Watts. A very narrow bandwidth RF output from the frequency generator 18 is emitted into the interior chamber 14 via the point source waveguide tube 34. The frequency generator 18 and point source waveguide tube 34 are hermetically sealed to the core 12.

The power generator 10 for medium-sized applications, such as a portable generator and a generator equipped to provide electricity to an entire home, can provide an output of about 1500 Watts to about 50,000 Watts of continuous output.

When the present invention is used for large-scale applications, the frequency generator 18 can optionally comprise a gyrotron or a klystron.

A gyrotron is a high-powered vacuum tube which emits millimeter-wave beams by bunching electrons with cyclotron motion in a strong magnetic field. Output frequencies range from about 20 GHz to about 250 GHz, and gyrotrons can be designed for pulsed or continuous operation. A gyrotron is a type of free electron MASER (Microwave Amplification by Stimulated Emission of Radiation). It has high power at millimeter wavelengths because its dimensions can be much larger than the wavelength, unlike conventional vacuum tubes, and it is not dependent on material properties, as are conventional MASER's.

A klystron is a specialized linear-beam vacuum tube. Klystrons are used as amplifiers at microwave and radio frequencies to produce both low-power reference signals for superheterodyne radar receivers and to produce high-power carrier waves for communications. They are the driving force for modern particle accelerators. Klystron amplifiers have the advantage over the magnetron of coherently amplifying a reference signal so its output may be precisely controlled in amplitude, frequency, and phase. Klystrons have an output in the range of 50 megawatts at frequencies nearing 3 GHz. Many klystrons have a waveguide for coupling microwave energy into and out of the device, although it is also quite common for lower power and lower frequency klystrons to use coaxial couplings instead. In some cases a coupling probe is used to couple the microwave energy from a klystron into a separate external waveguide. Klystrons operate by amplifying RF signals by converting the kinetic energy in a DC electron beam into radio frequency power. A beam of electrons is produced by a thermionic cathode (a heated pellet of low work function material), and accelerated by high voltage electrodes (typically in the tens of kilovolts). This beam is then passed through an input chamber. RF energy is fed into the input chamber at, or near, its natural frequency to produce a voltage which acts on the electron beam. The electric field causes the electrons to bunch because electrons which pass through during an opposing electric field are accelerated while later electrons are slowed, thereby causing the previously continuous electron beam to form bunches at the input frequency. The RF current carried by the beam will produce an RF magnetic field, and this will in turn excite a voltage across the gap of subsequent resident activities. In the output chamber, the developed RF energy is coupled out. The spent electron beam, with reduced energy, is then captured in a collector.

Large-sized applications require an output from the frequency generator 18 in the range of about 1500 Watts or greater. The frequency generator 18 can emit the RF output directly into the interior chamber 14 via the point source waveguide tube 34. The frequency generator 18 can also be attached to the core 12 via the waveguide tube 34 to emit the RF output into the core 12. The frequency generator 18 and point source waveguide tube 34 are hermetically sealed to the core 12.

The power generator 10 for large-sized applications, such as for powering industrial buildings, naval or space vessels, or to provide power to the national power grid, would provide an output of about 1500 megaWatts or more, depending upon the volume of the interior chamber 14.

In order to ensure that the power generator 10 operates at a proper temperature for peak performance and efficiency, means for cooling (not shown) can be provided as well. The means for cooling can be embodied by various structural elements. For instance, in small-scale applications such as in a laptop computer, the means for cooling can comprise the power generator 10—including the core 12 and frequency generator 18—being surrounded and embedded within an outer shell, such as a metal "strong box," to maintain both the integrity of the power generator 10 and to act as a heatsink. The means for cooling in such small-scale applications can comprise a cast metal "clamshell" type box having a top and a bottom half which are secured together by fasteners, such as screws. A gasket made from a heat conductive material can be secured between the halves of the box. In such an application, the means for cooling can be formed from metals having excellent thermal conductivity properties, such as molybdenum, molybdenum copper, tungsten, tungsten copper, and the like.

In medium-scale applications, the means for cooling can comprise heatsink fins attached directly to the exterior 24 of the core 12. The fins are formed from a material having a high thermal conductivity, such as metal. Preferably the metal used is aluminum, copper, or the like. The fins are affixed to the core 12 by a method which is conducive to the transfer of heat from the core 12 to the means for cooling, such as welding (when appropriate according to material types), fasteners (along with thermally conductive gaskets or grease), and so forth. An automated temperature control system (not shown) can be provided to operate the means for cooling to regulate the temperature of the core 12. The temperature control system can include at least one temperature sensor (e.g., a thermistor, thermocouple, etc.), means for effectuating the flow of a fluid over the fins (e.g., a fan), and a controller (e.g., processor, CPU, etc.) for turning the means for effectuating flow on and off to regulate the temperature of the core 12 within a preferable range.

In large-scale applications, the means for cooling can comprise the core 12 having a system of passageways through which a coolant may flow, such as found in the cooling system for an engine block. A coolant pump for circulating the coolant and means for cooling the coolant can also be provided. An automated system, such as described above, can be provided to ensure that the power generator 10 operates within a desired temperature range.

Although various embodiments of the invention have been disclosed for illustrative purposes, it is understood that one skilled in the art can make variations and modifications without departing from the spirit of the invention.

What is claimed is:

1. An apparatus comprising:
    (a) a core having an interior chamber, the interior chamber having a lining, and the interior chamber being held at a vacuum, the core further including a valve stem and a vacuum pump, the vacuum pump connected to the valve stem for creating the vacuum inside the interior chamber;
    (b) a waveguide having a first end and a second end, the first end being connected to the core and extending to the interior chamber, the waveguide comprising a hollow elongated tube;
    (c) a frequency generator for generating electromagnetic waves, the frequency generator being connected to the second end of the waveguide, whereby the electromagnetic waves are generated by the frequency generator, pass through the hollow tube of the waveguide, and enter the interior chamber of the core;
    (d) a plurality of electrodes extending into the interior chamber, the plurality of electrodes being electrically connected to an output; and
    (e) at least one diode that is electrically connected between the electrode and the output for regulating the direction of the flow of electricity.

2. The apparatus of claim 1 wherein the frequency generator is a magnetron.

3. The apparatus of claim 1 including an RF-permeable window secured to the core at the location where the first end of the waveguide connects to the core.

4. The apparatus of claim 1 wherein the electrodes comprise a metallic material.

5. The apparatus of claim 4 including a plurality of hollow resonator tubes, each one of the plurality of resonator tubes having a respective end that extends into the interior chamber, and each resonator tube surrounding a respective electrode.

6. The apparatus of claim 5 wherein the plurality of resonator tubes are each formed from glass.

7. The apparatus of claim 4 wherein the plurality of electrodes include tungsten.

8. The apparatus of claim 1 wherein the plurality of electrodes are ribbon-like in shape, the width of the electrodes being substantially wider than the thickness of the electrodes.

9. The apparatus of claim 8 wherein the waveguide comprises a metallic material.

10. The apparatus of claim 9 wherein the waveguide comprises a material selected from the group consisting of brass and copper.

11. The apparatus of claim 8 wherein the plurality of electrodes comprise a metallic material.

12. The apparatus of claim 11 wherein the plurality of electrodes include tungsten.

13. The apparatus of claim 11 including a plurality of hollow resonator tubes, the plurality of resonator tubes having a respective end that extends into the interior chamber, and each resonator tube surrounding a respective electrode.

14. The apparatus of claim 13 wherein the plurality of resonator tubes are each formed from glass.

15. The apparatus of claim 8 including a plurality of hollow resonator tubes, the plurality of resonator tubes having a respective end that extends into the interior chamber, and each resonator tube surrounding a respective electrode.

16. The apparatus of claim 8 wherein the waveguide comprises graphene.

17. The apparatus of claim 1 including a plurality of hollow resonator tubes, the plurality of resonator tubes having a respective end that extends into the interior chamber, and each resonator tube surrounding a respective electrode.

18. The apparatus of claim 17 wherein the plurality of resonator tubes are each formed from glass.

19. The apparatus of claim 17 wherein the plurality of resonator tubes are each formed from a material selected from the group consisting of glass, plastic, ceramic, and metal.

20. The apparatus of claim 1 wherein the lining comprises silicone.

21. The apparatus of claim 1 wherein the waveguide comprises a metallic material.

* * * * *